Dec. 5, 1950     C. F. HENNEY     2,532,618
REFRIGERATED VEHICLE

Filed Nov. 13, 1944     2 Sheets-Sheet 1

Charles F. Henney. INVENTOR.
BY Spencer, Hardman & Fehr.
His Attorneys.

Dec. 5, 1950  C. F. HENNEY  2,532,618
REFRIGERATED VEHICLE

Filed Nov. 13, 1944  2 Sheets-Sheet 2

Charles F. Henney, INVENTOR.
BY Spencer, Hardman & Fehr.
His Attorney.

Patented Dec. 5, 1950

2,532,618

UNITED STATES PATENT OFFICE 2,532,618

REFRIGERATED VEHICLE

Charles F. Henney, Dayton, Ohio, assignor to General Motors Corporation, Dayton, Ohio, a corporation of Delaware Application November 13, 1944, Serial No. 563,148

9 Claims. (Cl. 62—4)

This invention relates to refrigerating apparatus and more particularly to an improved refrigerating unit for use with trucks transporting perishable products.

It is an object of this invention to provide a unitary device which may be added to existing trucks or which may be installed on new trucks.

A further object of this invention is to provide an improved arrangement for defrosting the evaporator without heating any of the air in the refrigerated space.

More particularly, it is an object of this invention to provide means whereby relatively hot atmospheric air may be circulated over the evaporator for defrosting purposes.

Another object of this invention is to so arrange the air duct in a refrigerated truck so as to make it possible to circulate atmospheric air in thermal exchange with the evaporator for defrosting purposes without discharging any of the air thus circulated into the refrigerated space.

Further objects and advantages of the present invention will be apparent from the following description, reference being had to the accompanying drawings, wherein a preferred form of the present invention is clearly shown.

In the drawings:

Fig. 1 of the drawings is an elevational view somewhat diagrammatically showing my improved unit mounted underneath a truck;

Figure 1:
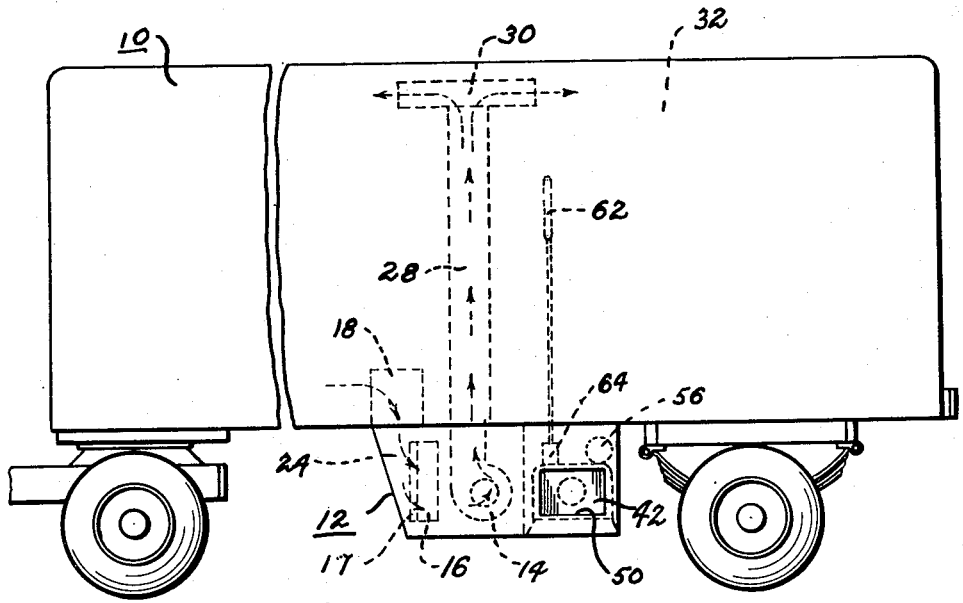
Figure 2:
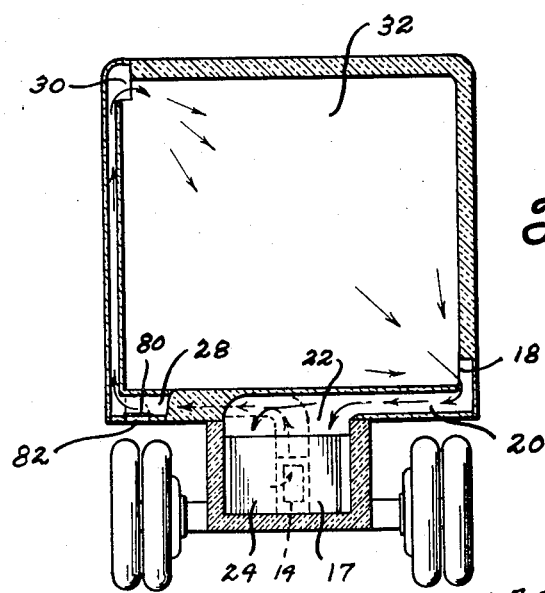
Fig. 2 is a sectional view showing the arrangement of the air distributing ducts.

Referring now to the drawings, reference numeral 10 designates a truck body of the type used for hauling perishable products. Numeral 12 generally designates a refrigerating unit of the type adapted to be mounted beneath the floor of the truck body 10 and numeral 14 designates a conventional blower which is used for circulating the air in thermal exchange with the evaporator 16 and the heater coil 17. As shown in Fig. 2 of the drawings, the return air outlet 18 communicates with a passage 20 leading to the inlet 22 of the evaporator compartment 24 (see Fig. 4). Air entering the evaporator compartment inlet 22 flows in thermal exchange with the heater coil 17 and thereafter the evaporator 16 and is then picked-up by the fan 14 and discharged through the air passage 28 which leads to the air distributing outlet 30 located in the upper portion of the refrigerated storage space 32 as shown in Figs. 1 and 2. The construction and arrangement of the air distributing member 30 may be varied somewhat although in the preferred arrangement, one portion of the air is distributed towards the one end of the storage space 32 and another portion of the air is distributed to the opposite end of the storage space.

The refrigerant liquefying unit comprises a rotary compressor 34 which is driven by a prime mover 36 through a centrifugal clutch 38. The prime mover 36 is preferably an internal combustion engine of the air cooled type but it is obvious other types of prime movers may also be used. The compressed refrigerant leaves the compressor 34 through the line 40 which leads to the condenser 42. The condensed refrigerant flows from the condenser 42 to the evaporator 16 through the line 44 in which there is provided a conventional flow-control device 46. The flow-control device 46 shown is intended to designate any of the many well-known types of flow-control devices, such as a thermostatic expansion valve or a fixed restrictor. The evaporated refrigerant is returned to the compressor through the usual suction line 48. The heating coil 17 may be connected to any suitable source of heat (not shown) and may be used for supplying heated air during cold weather and may also be used for supplying heat during defrosting of the evaporator if desired.

The condenser cooling air enters the condenser compartment through the air inlet 50 and is discharged from the condenser compartment through the outlet 52 arranged as shown. The condenser fan 54 is directly connected to the prime mover 36 and is arranged as shown between the condenser 42 and the prime mover 36 with the result that the condenser air is also used for cooling the prime mover 36. Reference numeral 56 designates a dynamo-electric machine which is used for charging a battery (not shown) when the engine is operating and which is used as a starting motor for cranking purposes. The dynamo-electric machine 56 is connected to the engine through the belt 58 arranged as shown. The evaporator fan 14 is also driven by the prime mover 36 through the belt 60.

The temperature control apparatus comprises a temperature responsive element 62 within the refrigerated space 32 which is used for operating the prime mover throttle 64. When maximum refrigeration is required, the prime mover 36 is operated at high speed, but as the refrigeration requirements decrease, the speed of the prime mover 36 is decreased accordingly. During high speed operation, the prime mover is preferably operated at a speed of 1800 R. P. M. whereas during the light refrigeration requirements the speed of the prime mover is reduced to approximately 1400 R. P. M. When no refrigeration is required, the speed of the prime mover is reduced slightly below 1400 R. P. M. at which speed the centrifugal clutch 38 declutches the compressor 34 from the prime mover 36. Thus, it is possible to continue the operation of the fans and the prime mover 36 even when no refrigeration is required.

Figure 4:
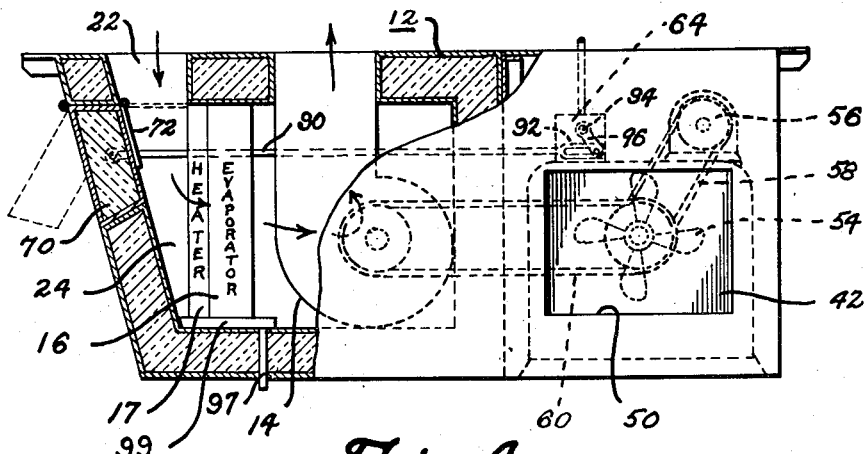
Fig. 4 is an elevational view, with parts broken away, showing the construction of the refrigerating apparatus.

During normal operation of the refrigerating apparatus, frost will accumulate on the evaporator and when the accumulation of frost on the evaporator exceeds a certain amount, the evaporator losses its efficiency with the result that it becomes necessary to defrost the evaporator. When it is desired to defrost the evaporator, the door 70 provided in the front wall of the evaporator chamber 24 is opened and the damper 72 located at the inlet of the evaporator chamber is moved from its full line position as shown in Fig. 4 to its dotted line position so as to close-off the evaporator compartment inlet opening 22. With the door 70 opened and the damper 72 moved into its dotted line position, outside air will be caused to flow in thermal exchange with the evaporator and will normally serve to defrost the evaporator even without the application of heat by the coil 17. Since it is not desirable to discharge any of this relatively warm outside air into the refrigerated space, I have provided a damper 80 in the duct 28 for blocking-off the flow of air through the duct 28 and for discharging the air to the outside through the opening 82 (see Fig. 2). The door 70, as well as the dampers 72 and 80, are preferably manually controlled. However, it is within the purview of this invention to provide automatic means for operating the door 70 and the dampers 72 and 80 simultaneously or individually in response to the frosting requirements. By virtue of the above described arrangement, it is obvious that the air used for defrosting the evaporator is relatively hot air and is discharged directly to the outside atmosphere without passing through the refrigerated space.

Figure 3:
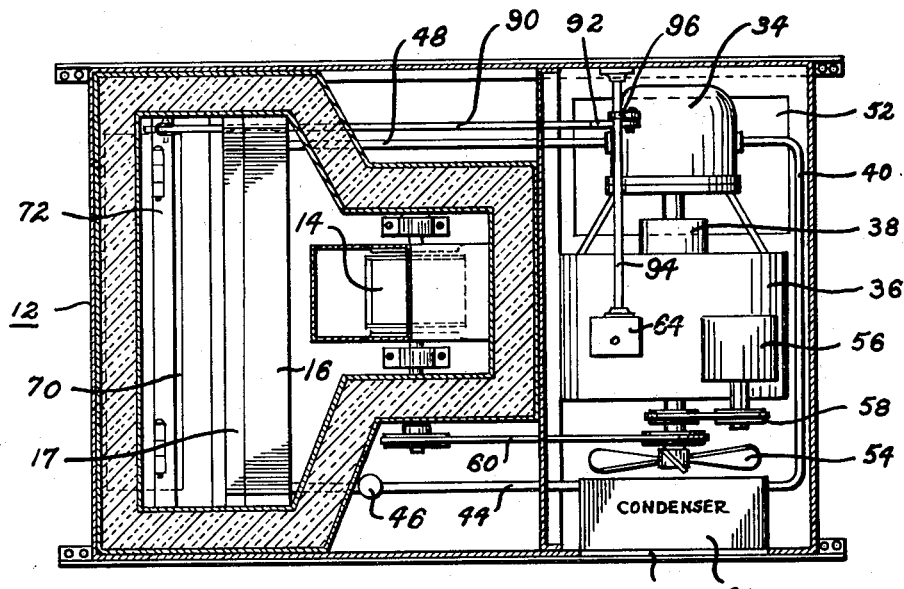
Fig. 3 is a horizontal sectional view showing the construction and arrangement of the refrigerating system.

Since defrosting can most effectively be done when the compressor is not operating I have provided means for automatically reducing the speed of the engine below 1400 R. P. M. upon opening the defroster door 70 so as to declutch the compressor. The mechanism for automatically reducing the speed of the engine so as to declutch the compressor during defrosting comprises a rod 90 having its one end pivotally connected to the door 70 as best shown in Fig. 4 and having its other end provided with a slotted throttle engaging portion 92. The throttle comprises a rotatable shaft 94 (see Fig. 3) which has secured thereto an operating arm 96 for engaging the slotted portion 92 of the rod 90. The slotted arrangement 92 allows the thermostat 62 to vary the speed of the engine within the desired range without interference from the slotted portion 92 of the rod 90 whenever the door 70 is in its fully closed position. However, when the door 70 is opened the rod 90 swings the lever 96 into the slow speed position so as to automatically reduce the speed of the engine below the speed at which the centrifugal clutch 38 cuts out the operation of the compressor 34. By virtue of this arrangement the prime mover 36 operates the evaporator fan during the defrosting operation but does not operate the compressor. Reference numeral 97 designates a drain for draining the drip tray 99 located beneath the evaporator 16.

While I have shown the prime mover located behind the evaporator compartment, it is within the purview of this invention to place the prime mover alongside of the evaporator compartment so as to make it possible to directly connect the evaporator fan to the main prime mover shaft. For purposes of illustration, the prime mover and the refrigerant liquefying apparatus have been shown enclosed except for the air inlet 50 and the bottom outlet 52 whereas this apparatus may be mounted right out in the open so as to be accessible for servicing. By making slight changes in the arrangement of the parts the apparatus could be mounted on the front or back wall of the truck in place of on the bottom, or the unit could be split and the evaporator compartment mounted on one wall and the refrigerant liquefying apparatus mounted elsewhere in which case the dynamo-electric machine 56 could be used for supplying power to a motor for driving the evaporator blower. The dynamo-electric machine 56 may also be used for supplying current for operating various control solenoids (not shown).

While the form of embodiment of the invention as herein disclosed constitutes a preferred form, it is to be understood that other forms might be adopted, as may come within the scope of the claims which follow.

What is claimed is as follows:

1. In a system for supplying refrigerated air to a space, an evaporator for cooling said air, a condenser, a compressor for withdrawing refrigerant vapor from said evaporator and for discharging compressed refrigerant into said condenser, compressor operating means, clutch means between said compressor and said compressor operating means, selective means for selectively directing either recirculated air or outside air in thermal exchange with said evaporator, and clutch control means for said clutch, and interlock means between said selective means and said clutch control means for insuring that said clutch is in the declutched position when outside air is directed in thermal exchange with said evaporator.

2. In a refrigerating system, an evaporator, a condenser, a compressor, a prime mover, power transmitting means including a speed responsive clutch between said prime mover and said compressor, means responsive to the refrigeration requirements for controlling the speed of said prime mover, fan means for flowing air in thermal exchange with said evaporator, and means for directly connecting said fan means to said prime mover whereby said fan operates at all times when said prime mover is in operation.

3. In combination, an evaporator, a condenser, a compressor, refrigerant flow connections between said evaporator condenser and compressor, a continuously running engine for operating said compressor, power transmitting means between said engine and said compressor including a speed responsive clutch for disconnecting the compressor from the engine at low engine speeds, means responsive to refrigerating requirements for modulating the speed of said engine, blower means for circulating air in thermal exchange with said evaporator, and means for directly connecting said blower means to said engine.

4. In a refrigerating system, an evaporator, a condenser, a compressor, a prime mover, power transmitting means between said compressor and said prime mover including a clutch, means for flowing a defrosting medium in thermal exchange with said evaporator, and means for automatically declutching said compressor while said defrosting medium flows in thermal exchange with said evaporator.

5. In a refrigerating system, an evaporator, a condenser, a compressor, compressor operating means, clutch means between said compressor operating means and said compressor, means for initiating defrosting of said evaporator including means for declutching said compressor from said prime mover.

6. In a refrigerating system, an evaporator, a condenser, a compressor, compressor operating means, centrifugal clutch means between said compressor operating means and said compressor, means for initiating defrosting of said evaporator including means for declutching said compressor from said prime mover, and means responsive to refrigeration requirements for varying the speed of said compressor operating means.

7. In combination with a truck having walls forming a storage space for transporting perishable products, refrigerating apparatus for refrigerating said storage space, said apparatus comprising a cabinet secured to the outside of said truck, means for flowing air through said cabinet including means forming a first air flow passage for conveying air from said storage space to said cabinet, an evaporator arranged in the path of the air flowing through said cabinet, a refrigerant liquefying means mounted in said cabinet and connected in operative refrigerant circuit relationship with said evaporator, means forming a second air flow passage for conveying air from said cabinet to said space, means for defrosting said evaporator comprising means for introducing atmospheric air into said cabinet, and means for directing air used for defrosting said evaporator directly to the outside atmosphere without passing within the confines of said storage space walls.

8. In a system for supplying refrigerated air to a space, an evaporator for cooling said air, a condenser, a compressor for withdrawing refrigerant vapor from said evaporator and for discharging compressed refrigerant into said condenser, compressor operating means, clutch means between said compressor and said compressor operating means, damper means for selectively directing either recirculated air or outside air in thermal exchange with said evaporator, and means for simultaneously causing declutching of said clutch and for operating said damper means so as to direct outside air in thermal exchange with said evaporator.

9. Apparatus for supplying refrigerated air for a space to be cooled comprising an evaporator, a condenser, compressor means, a prime mover, control means responsive to the temperature in said space for varying the speed of said prime mover and for connecting and disconnecting the prime mover and the compressor means, selective circulating means for selectively circulating either outside air or air from said space in thermal exchange with said evaporator, and interlock means between said control means and said selective means for disconnecting said compressor means from said prime mover when said selective means is set to circulate outside air in thermal exchange with said evaporator.

CHARLES F. HENNEY.

REFERENCES CITED

The following references are of record in the file of this patent:

UNITED STATES PATENTS

| Number | Name | Date |
|---|---|---|
| 2,007,719 | Killingstad | July 9, 1935 |
| 2,124,268 | Williams | July 19, 1938 |
| 2,227,686 | Wittman | Jan. 7, 1941 |
| 2,262,375 | Smith | Nov. 11, 1941 |
| 2,336,735 | Jones | Dec. 14, 1943 |